(12) United States Patent
Kitoh et al.

(10) Patent No.: US 9,989,315 B2
(45) Date of Patent: Jun. 5, 2018

(54) COLD STORAGE HEAT EXCHANGER

(71) Applicant: DENSO CORPORATION, Kariya, Aichi-pref. (JP)

(72) Inventors: Yuusuke Kitoh, Chiryu (JP); Toshiya Nagasawa, Obu (JP); Eiichi Torigoe, Anjo (JP); Aun Ota, Okazaki (JP); Jun Abei, Obu (JP); Daisuke Haseba, Toyota (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 589 days.

(21) Appl. No.: 14/420,280

(22) PCT Filed: Jun. 20, 2013

(86) PCT No.: PCT/JP2013/003856
§ 371 (c)(1),
(2) Date: Feb. 6, 2015

(87) PCT Pub. No.: WO2014/024375
PCT Pub. Date: Feb. 13, 2014

(65) Prior Publication Data
US 2015/0198383 A1    Jul. 16, 2015

(30) Foreign Application Priority Data
Aug. 7, 2012 (JP) .................... 2012-175184

(51) Int. Cl.
F28D 20/00 (2006.01)
F28D 1/053 (2006.01)
F28D 20/02 (2006.01)

(52) U.S. Cl.
CPC ..... F28D 20/0034 (2013.01); F28D 1/05366 (2013.01); F28D 20/02 (2013.01);
(Continued)

(58) Field of Classification Search
CPC .... F28D 20/02; F28D 20/0034; F28D 20/021; F28D 2020/0013; F28D 2020/0008; F28D 1/05366; Y02E 60/145
(Continued)

(56) References Cited

U.S. PATENT DOCUMENTS 6,274,101 B1 * 8/2001 Sechrist ................ B01J 19/249
422/198
7,891,412 B2 * 2/2011 Loup ..................... B60H 1/005
165/10

(Continued)

FOREIGN PATENT DOCUMENTS

CN    101825377 A    9/2010
DE    102004035818 A1    3/2006
(Continued)

OTHER PUBLICATIONS

International Search Report and Written Opinion (in Japanese with English Translation) for PCT/JP2013/003856, dated Aug. 20, 2013; ISA/JP.
(Continued)

*Primary Examiner* — Jianying Atkisson
*Assistant Examiner* — Joel Attey
(74) *Attorney, Agent, or Firm* — Harness, Dickey & Pierce, P.L.C.

(57) ABSTRACT

A cold storage heat exchanger has refrigerant pipes fins, and cold-storage-medium containers. The cold-storage-medium container is arranged next to the refrigerant pipe. A cold storage medium is accommodated in the cold-storage-medium container in order to leave an air cell, and to provide a filling ratio of less than 90%. The cold-storage-medium container has a plurality of depressions at an inside of the cold-storage-medium container. The depression is a dimple. The plurality of depressions are joined each other at top parts
(Continued)

and provide high rigidity. The cold-storage-medium container is positioned on the refrigerant pipe by an engaging projection. An open end of an open depression is covered by the refrigerant pipe. The cold storage medium can flow into the open depression. Therefore, the cold storage medium may directly contact the refrigerant pipe, and is directly cooled with the refrigerant.

12 Claims, 10 Drawing Sheets

(52) U.S. Cl.
CPC .... *F28D 20/021* (2013.01); *F28D 2020/0008* (2013.01); *F28D 2020/0013* (2013.01); *Y02E 60/145* (2013.01)

(58) Field of Classification Search
USPC ................ 165/100, 104.14, 167, 902, 4, 10
See application file for complete search history.

(56) References Cited

U.S. PATENT DOCUMENTS

| | | | |
|---|---|---|---|
| 2005/0154644 A1 | 7/2005 | Deakin et al. | |
| 2009/0236079 A1* | 9/2009 | Khodadadi | B82Y 30/00 165/104.21 |
| 2010/0051227 A1* | 3/2010 | Anbudurai | F24J 2/34 165/10 |
| 2010/0065244 A1 | 3/2010 | Yokoyama et al. | |
| 2010/0223949 A1 | 9/2010 | Higashiyama et al. | |
| 2010/0307180 A1* | 12/2010 | Yamada | F25D 19/00 62/285 |
| 2011/0239696 A1 | 10/2011 | Takagi | |
| 2012/0042687 A1 | 2/2012 | Kamoshida et al. | |
| 2013/0105924 A1 | 5/2013 | Kobayashi et al. | |

FOREIGN PATENT DOCUMENTS

| | | |
|---|---|---|
| JP | H11270975 A | 10/1999 |
| JP | 2002115985 A | 4/2002 |
| JP | 2010091250 A | 4/2010 |
| JP | 2010139225 A | 6/2010 |
| JP | 2011012947 A | 1/2011 |
| JP | 2011-133178 | 7/2011 |
| JP | 2011-147882 | 8/2011 |
| JP | 2011-150718 | 8/2011 |
| JP | 2012-033878 | 2/2012 |
| JP | 2012042167 A | 3/2012 |
| JP | 2012102969 A | 5/2012 |
| JP | 2012126149 A | 7/2012 |
| JP | 2012137199 A | 7/2012 |
| WO | WO2010-074016 | 7/2010 |
| WO | WO-2010150774 A1 | 12/2010 |

OTHER PUBLICATIONS

Office Action dated Oct. 6, 2015 in corresponding Japanese Application No. 2012-175184.

* cited by examiner

COLD STORAGE HEAT EXCHANGER

CROSS REFERENCE TO RELATED APPLICATIONS

This application is a U.S. National Phase Application under 35 U.S.C. 371 of International Application No. PCT/JP2013/003856 filed on Jun. 20, 2013 and published in Japanese as WO 2014/024375 on Feb. 13, 2014. This application is based on and claims the benefit of priority from Japanese Patent Application No. 2012-175184 filed on Aug. 7, 2012. The entire disclosures of all of the above applications are incorporated herein by reference.

BACKGROUND

Technical Field

The present invention relates to a cold storage heat exchanger which may be used for a refrigerating cycle.

Background Art

As shown in PLT1-PLT3, cold storage heat exchangers are known. The cold storage heat exchanger is provided by adding a cold storage medium on an evaporator which is one of heat exchanger for a refrigerating cycle. The cold storage heat exchanger has a cold-storage-medium container to be disposed to contact on a refrigerant passage pipe.

PLT1 JP2011-12947A
PLT2 JP2010-91250A
PLT3 DE102004035818A

SUMMARY

One of disadvantages to be solved of the cold storage heat exchanger is volume change of the cold storage medium caused by temperature change. Volume of the cold storage medium varies as temperature changes. On the other hand, it is desirable that the cold storage medium is accommodated in a sealed container. As the container is deformed by volume change of the cold storage medium, there may be disadvantages such as lowering of heat conduction, and leakage of the cold storage medium. Therefore, it is desirable that deformation of the container is avoided.

One of disadvantages to be solved of the cold storage heat exchanger is speed of cold storage. A cold storage speed may be evaluated as a speed of absorbing and storing of low temperature into the cold storage medium. In the conventional cold storage heat exchanger, further improvement is required in view of the cold storage speed.

In one of viewpoints, it is considered that a cold storage speed is spoiled, since both an outer wall of the refrigerant pipe and an outer wall of the cold-storage-medium container may become barriers of heat conduction between a refrigerant and the cold storage medium.

In another one of viewpoints, it is considered that cold storage into the cold storage medium is prevented by direct contact of hot air to the cold-storage-medium container.

In another one of viewpoints, it is considered that cold storage into the cold storage medium is prevented, since a heat-conduction distance in the cold storage medium from an outer wall of the cold-storage-medium container is long.

In another one of viewpoints, it is considered that cold storage into the cold storage medium is prevented, since the lowness of a thermal conductivity within the cold-storage-medium container.

One of disadvantages to be solved of the cold storage heat exchanger is a positioning between the refrigerant pipe and the cold-storage-medium container. The refrigerant pipe and the cold-storage-medium container are required to be placed relatively at a proper positioning relationship. Such positioning relationship is effective also in order to acquire a heat conduction of an expected level between the refrigerant and the cold storage medium.

The present invention is made in view of the above-mentioned disadvantages and it is an object to provide an improved cold storage heat exchanger.

It is other one of objects of the present invention to provide a cold storage heat exchanger in which deformation of a cold-storage-medium container is reduced.

It is other one of objects of the present invention to provide a cold storage heat exchanger with a quick cold storage speed.

It is other one of objects of the present invention to provide a cold storage heat exchanger having improved heat conduction between a refrigerant and a cold storage medium.

It is other one of objects of the present invention to provide a cold storage heat exchanger in which a direct contact between hot air and a cold-storage-medium container is reduced.

It is other one of objects of the present invention to provide a cold storage heat exchanger with a short heat conduction distance of a cold storage medium.

It is other one of objects of the present invention to provide a cold storage heat exchanger with an improved thermal conductivity within the cold-storage-medium container.

It is other one of objects of the present invention to provide a cold storage heat exchanger in which a refrigerant pipe and a cold-storage-medium container are fixed at a predetermined positioning relationship.

One of disclosed inventions employs the following technical means, in order to attain the above-mentioned object.

One of the disclosure is a cold storage heat exchanger, comprising: a plurality of refrigerant pipes which are arranged each other with interval, and each of which has refrigerant passage; and a cold-storage-medium container which defines a chamber in which a cold storage medium is accommodated, the cold-storage-medium container being disposed next to at least one of the refrigerant pipes and being joined to the refrigerant pipe, wherein the refrigerant pipe and/or the cold-storage-medium container defines an air passageway for carrying out heat exchange with air, and wherein the cold storage medium is accommodated to leave an air cell within the cold-storage-medium container, and provides less than 90% in a filling ratio within the cold-storage-medium container. According to this configuration, it is possible to reduce deformation of the cold-storage-medium container caused by expansion of the cold storage medium.

One of the disclosure is a cold storage heat exchanger, comprising: a plurality of refrigerant pipes which are arranged each other with interval, and each of which has refrigerant passage; and a cold-storage-medium container which defines a chamber in which a cold storage medium is accommodated, the cold-storage-medium container being disposed next to at least one of the refrigerant pipes and being joined to the refrigerant pipe, wherein the refrigerant pipe and/or the cold-storage-medium container defines an air passageway for carrying out heat exchange with air, and wherein the cold-storage-medium container includes: a plurality of depressions which projects towards inside from an outside surface facing the refrigerant pipe; a joined portion which is formed to surround at least one of the depressions, and is joined to the refrigerant pipe; and a communicating aperture which is formed on the depression surrounded by the joined portion, and communicates an inside and an outside of the cold-storage-medium container, and allows the cold storage medium to directly contact with the refrigerant pipe by allowing the cold storage medium to pass therethrough to the outside of the depression.

According to this structure, the cold storage medium is allowed to pass through the outside of the depression via the communicating aperture. Direct contact with the cold storage medium and the refrigerant pipe is realized. Accordingly, it is possible to promote heat conduction from the refrigerant pipe to the cold storage medium. In addition, since the side plate portion, which forms the depression, of the cold-storage-medium container projects into the cold-storage-medium container, it promotes heat transfer. Therefore, the heat conduction between the refrigerant and the cold storage medium is improved.

One of the disclosure is a cold storage heat exchanger, comprising: a plurality of refrigerant pipes which are arranged each other with interval, and each of which has refrigerant passage; and a cold-storage-medium container which defines a chamber in which a cold storage medium is accommodated, the cold-storage-medium container being disposed next to at least one of the refrigerant pipes and being joined to the refrigerant pipe, wherein the refrigerant pipe and/or the cold-storage-medium container defines an air passageway for carrying out heat exchange with air, and wherein the cold storage heat exchanger, further comprises: an outer fin which is arranged on an upstream side than the cold-storage-medium container with respect to the air flow direction, and is joined to the refrigerant pipe, and colds the air which contacts the cold-storage-medium container. According to this structure, air which contacts the cold-storage-medium container is cooled. Therefore, direct contact between not yet cooled hot air for air conditioning and the cold-storage-medium container is suppressed.

One of the disclosure is a cold storage heat exchanger, comprising: a plurality of refrigerant pipes which are arranged each other with interval, and each of which has refrigerant passage; and a cold-storage-medium container which defines a chamber in which a cold storage medium is accommodated, the cold-storage-medium container being disposed next to at least one of the refrigerant pipes and being joined to the refrigerant pipe, wherein the refrigerant pipe and/or the cold-storage-medium container defines an air passageway for carrying out heat exchange with air, and wherein a thickness of the cold-storage-medium container is smaller than a thickness of the air passageway. According to this structure, it is possible to make a thickness of the cold storage medium accommodated in the cold-storage-medium container thinner. Therefore, it is possible to shorten heat-conduction distance of the cold storage medium.

One of the disclosure is a cold storage heat exchanger, comprising: a plurality of refrigerant pipes which are arranged each other with interval, and each of which has refrigerant passage; and a cold-storage-medium container which defines a chamber in which a cold storage medium is accommodated, the cold-storage-medium container being disposed next to at least one of the refrigerant pipes and being joined to the refrigerant pipe, wherein the refrigerant pipe and/or the cold-storage-medium container defines an air passageway for carrying out heat exchange with air, and wherein the cold-storage-medium container therein has a heat-conduction promoting member which has thermal conductivity higher than the cold storage medium and is not fixedly joined to the cold-storage-medium container.

According to this structure, the thermal conductivity within the cold-storage-medium container is improved.

DESCRIPTION OF EMBODIMENTS

Figure 1:
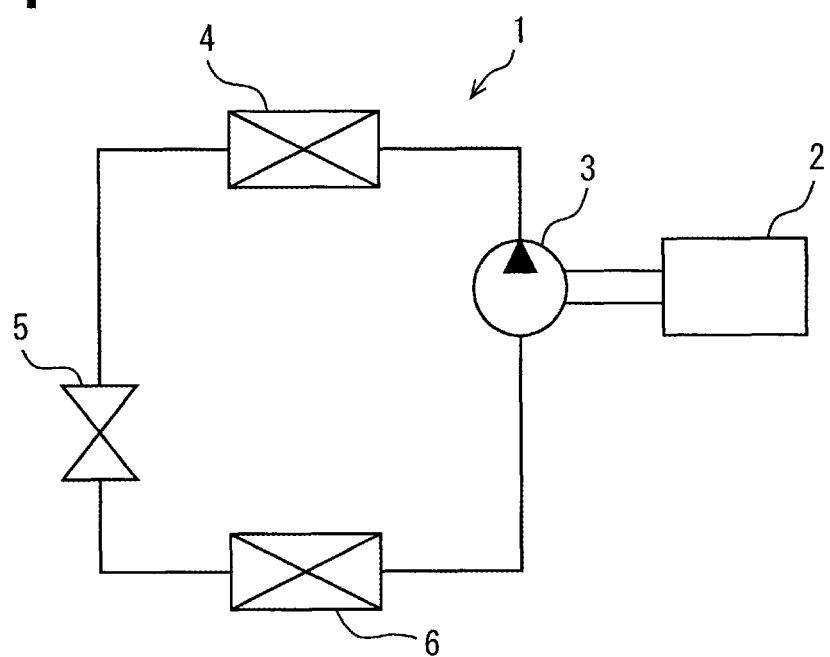
FIG. 1 is a block diagram showing a refrigeration cycle according to a first embodiment of the present invention.

Referring to the drawings, embodiments of the present disclosure are described hereinafter. In the embodiments, the parts corresponding to the matter described in the previous embodiment are indicated with the same reference numbers and the same descriptions will not be reiterated. In a case that only a part of component is described, the other embodiments previously described may be applied to the other parts of components. In a consecutive embodiment, a correspondence is shown by using a similar reference symbol in which only hundred and more digits differ to indicate a part corresponding to a matter described in the previous embodiment, and the same description may not be repeated. It is possible to combine the embodiments in some forms which are clearly specified in the following description, and also, unless trouble arises, in some forms which are not clearly specified.

First Embodiment

FIG. 1 is a block diagram showing a configuration of a refrigeration cycle according to a first embodiment of the present invention. The refrigeration cycle 1 is used for an air-conditioner for a vehicle. The vehicle may have a power source 2 mounted on the vehicle. The power source 2 is an internal combustion engine for driving the vehicle or an electric motor for driving the refrigeration cycle 1. The refrigeration cycle 1 has a compressor 3, a radiator 4, a reducer 5, and an evaporator 6. Those components are connected in a closed circuit by conduits and provide a refrigerant recirculation path.

The compressor 3 is driven by the power source 2. Accordingly, if the power source 2 stops, the compressor 3 also stops. The compressor 3 sucks and compresses a refrigerant from the evaporator 6, and discharges a compressed refrigerant to the radiator 4. The radiator 4 cools a high temperature refrigerant. The radiator 4 is also called as a condenser. The reducer 4 decompresses the refrigerant cooled by the radiator 4. The reducer 5 may be provided by a fixed orifice, a temperature sensitive type expansion valve, or an ejector. The evaporator 6 evaporates the refrigerant decompressed by the reducer 5, and cools a medium. The evaporator 6 cools the air supplied to a vehicle compartment. The evaporator 6 is a cold storage heat exchanger. The refrigeration cycle 1 can be further equipped with an internal heat exchanger which carries out heat exchange of a high-pressure side liquid refrigerant and the low-pressure side gas refrigerant and tank components, such as a receiver or an accumulator which store an excessive refrigerant.

Figure 2:
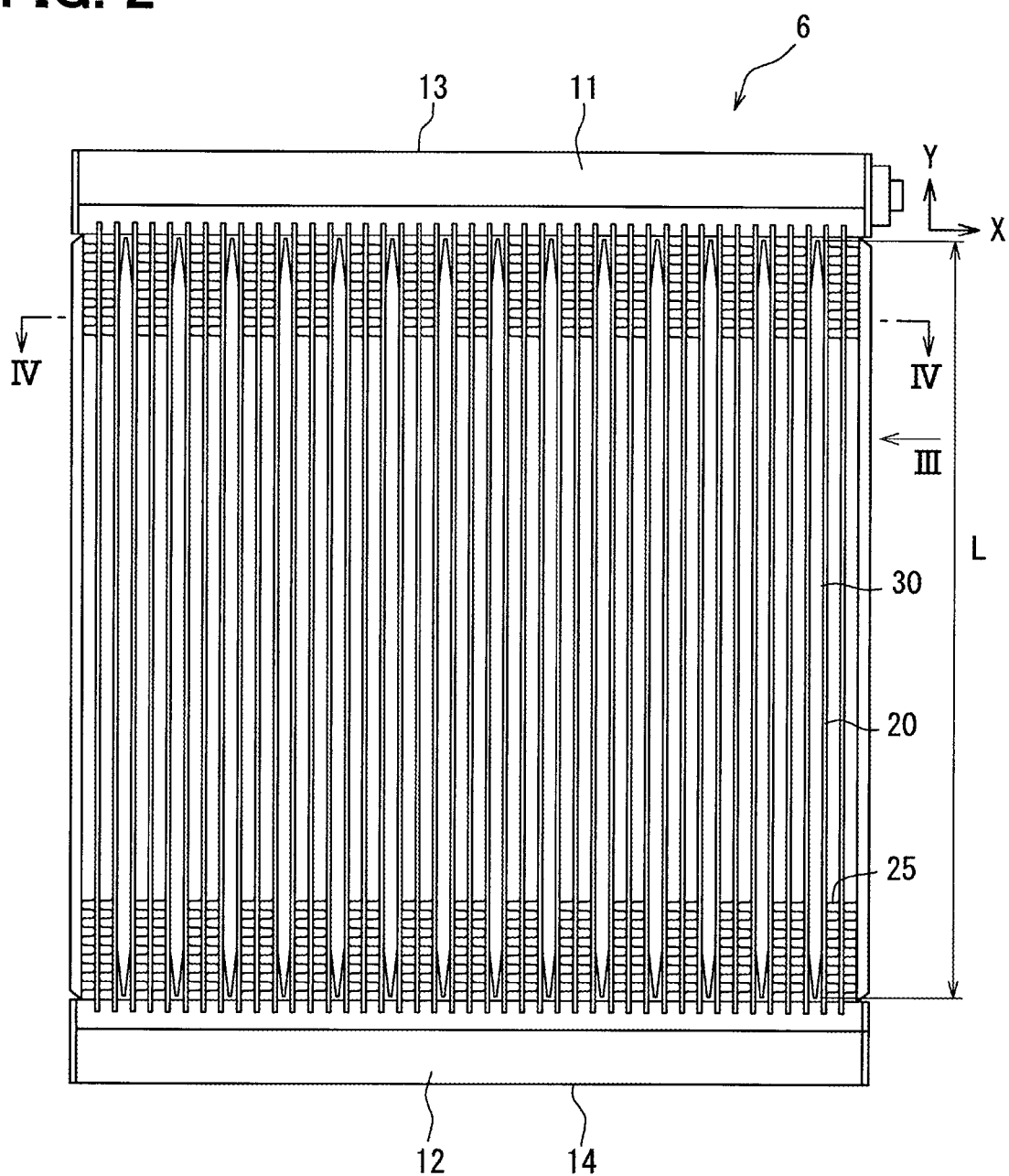
FIG. 2 is a front view of a cold storage heat exchanger according to the first embodiment.
Figure 3:
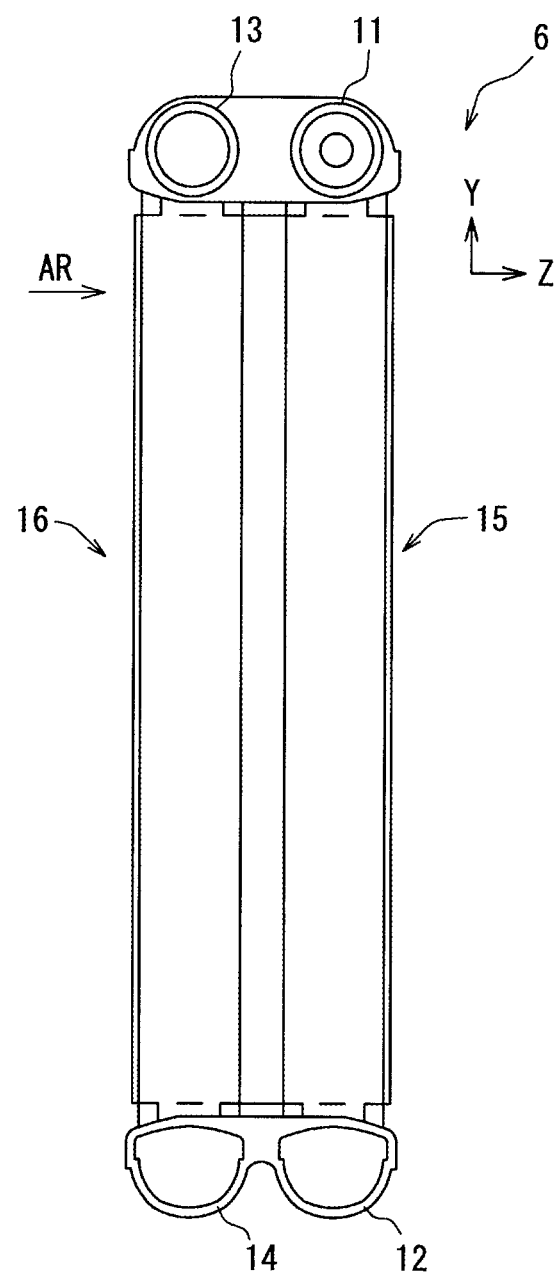
FIG. 3 is a side view of the cold storage heat exchanger according to the first embodiment.
Figure 4:
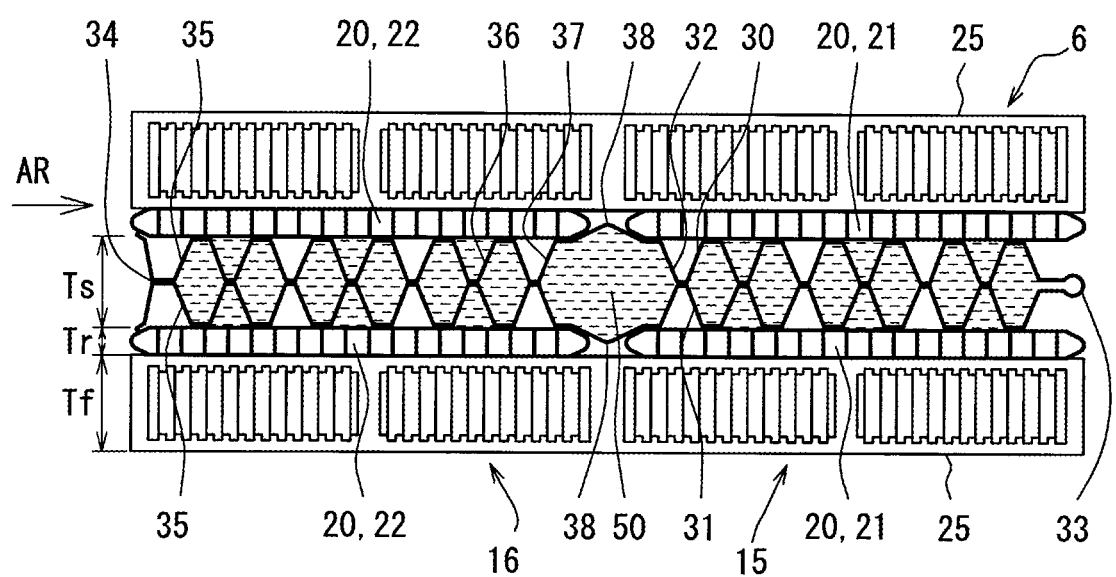
FIG. 4 is a partial cross-sectional view of the cold storage heat exchanger according to the first embodiment.

FIG. 2 is a front view of the evaporator 6 which is the cold storage heat exchanger according to the first embodiment. FIG. 3 is a side view of FIG. 2. FIG. 4 is a partial enlarged cross sectional view of a line IV-IV on FIG. 2.

Referring to FIGS. 2 and 3, the evaporator 6 has a plurality of refrigerant pipe 20, a plurality of fins 25, and a plurality of cold-storage-medium containers 30. The evaporator 6 has the refrigerant passage member which branched to plurality. This refrigerant passage member is provided by metal passage members, such as aluminum. The refrigerant passage member is provided by headers 11, 12, 13, and 14 which are disposed to make pairs, and a plurality of refrigerant pipes 20 which connect between these pair of headers. The plurality of refrigerant pipes 20 are arranged each other with intervals, and each of which has refrigerant passage.

The first header 11 and the second header 12 make a pair and are arranged spaced apart each other and in parallel. The plurality of refrigerant pipes 20 are arranged at equal intervals between the first header 11 and the second header 12. A longitudinal direction Y of the refrigerant pipe 20 is in agreement with a height direction Y of the evaporator 6. Each of the refrigerant pipes 20 is communicated with the corresponding one of the headers 11 and 12 at the ends. The first heat exchange portion 15 is formed by the first header 11, the second header 12, and the plurality of refrigerant pipes 20 arranged among them.

The third header 13 and the fourth header 14 also makes a pair and are arranged spaced apart each other and in parallel. The plurality of refrigerant pipes 20 are arranged at equal intervals between the third header 13 and the fourth header 14. Each of the refrigerant pipes 20 is communicated with the corresponding one of the headers 13 and 14 at the ends. The second heat exchange portion 16 is formed by the third header 13, the fourth header 14, and the plurality of refrigerant pipes 20 arranged among them.

As a result, the evaporator 6 has the first heat exchange portion 15 and the second heat exchange portion 16 which are arranged in a two layered manner along an air flowing direction. About the air flowing direction, i.e., an air flow direction AR, the second heat exchange portion 16 is arranged at an upstream side. The first heat exchange portion 15 is arranged at a downstream side. The air flow direction AR is in agreement with the width direction Z of the evaporator 6.

The plurality of refrigerant pipes 20 are arranged along an arranging direction X so as to be arranged in parallel each other. The plurality of refrigerant pipes 20 are arranged at almost constant interval along the arranging direction X. The arranging direction X corresponds to a length direction X of the evaporator 6. About the length direction X, a plurality of gaps are formed among the plurality of refrigerant pipes 20. It is desirable that the plurality of fins 25 and the plurality of cold-storage-medium containers 30 are disposed in the gaps with a predetermined regular pattern. A part of the gaps are air passageways. The remaining parts of the gaps are accommodation parts. Not less than 10% and not greater than 50% of the gaps among all of the plurality of gaps formed among the refrigerant pipes 20 are used as the accommodation parts. The cold-storage-medium container 30 is arranged at the accommodation part. The cold-storage-medium container 30 is disposed next to at least one of the refrigerant pipes 20, and is joined to the refrigerant pipe 20 thermally and mechanically. The cold-storage-medium containers 30 are almost evenly distributed over the evaporator 6. Two refrigerant pipes 20 located on both sides of the cold-storage-medium container 30 define the air passageway for carrying out heat exchange to air at the opposite sides thereof to the cold-storage-medium container 30. In another viewpoint, two refrigerant pipes 20 are arranged between two fins 25, and also one cold-storage-medium container 30 is arranged between these two refrigerant pipes 20.

A joint as a refrigerant inlet is formed on the end of the first header 11. An inside of the first header 11 is partitioned in a first cavity and a second cavity by a partitioning plate disposed on an almost center along the length direction X thereof. Corresponding to this, the plurality of refrigerant pipes 20 are classified into a first group and a second group. The refrigerant is supplied to the first cavity of the first header 11. The refrigerant is distributed to the plurality of refrigerant pipes 20 belonging to the first group from the first cavity. The refrigerant flows into the second header 12 through the first group, and collected. The refrigerant is again distributed to the plurality of refrigerant pipes 20 belonging to the second group from the second header 12. The refrigerant flows into the second cavity of the first header 11 through the second group. Thus, in the first heat exchange portion 15, a channel which allows the refrigerant to flow in a shape of U character is formed.

A joint as a refrigerant outlet is formed on the end of the third header 13. An inside of the third header 13 is partitioned in a first cavity and a second cavity by a partitioning plate disposed on an almost center along the length direction X thereof. Corresponding to this, the plurality of refrigerant pipes 20 are classified into a first group and a second group. The first cavity of the third header 13 is next to the second cavity of the first header 11. The first cavity of the third header 13 and the second cavity of the first header 11 are communicated. The refrigerant flows from the second cavity of the first header 11 to the first cavity of the third header 13. The refrigerant is distributed to the plurality of refrigerant pipes 20 belonging to the first group from the first cavity. The refrigerant flows into the fourth header 14 through the first group, and collected. The refrigerant is again distributed to the plurality of refrigerant pipes 20 belonging to the second group from the fourth header 14. The refrigerant flows into the second cavity of the third header 13 through the second group. Thus, in the second heat exchange portion 16, a channel which allows the refrigerant to flow in a shape of U character is formed. The refrigerant in the second cavity of the third header 13 flows out from the refrigerant outlet, and flows towards the compressor 3.

In FIG. 4, the refrigerant pipe 20 is a multi-hole pipe which has a plurality of refrigerant passages therein. The refrigerant pipe 20 is also called as a flat tube. This multi-hole pipe can be obtained by an extrusion process. The plurality of refrigerant passages extend along the longitudinal direction Y of the refrigerant pipe 20, and open at both ends of the refrigerant pipe 20. The plurality of refrigerant pipes 20 contain first refrigerant pipes 21 belonging to the first heat exchange portion 15, and second refrigerant pipes 22 belonging to the second heat exchange portion 16. The plurality of refrigerant pipes 20 are arranged so as to provide a double row with respect to the width direction Z of the evaporator 6. The plurality of refrigerant pipes 20 are arranged so as to form the above-mentioned first heat exchange portion 15 and the second heat exchange portion 16, and to form two rows with respect to the width direction Z of the evaporator 6. In each row, the plurality of refrigerant pipes 20 are disposed to oppose principal planes thereof. The plurality of refrigerant pipes 20 define the air passageway for carrying out heat exchange to air, and the accommodation part for accommodating the cold-storage-medium container mentioned later between two refrigerant pipes 20 which are adjacent to each other.

The evaporator 6 has fin members 25 which increase contact-surface area to air supplied to the vehicle compartment. The fin members 25 are provided by the plurality of fins 25 of Colgate type. The fin 25 is arranged at the air passageway defined between two adjacent refrigerant pipes 20. The fin 25 is thermally connected with two adjacent refrigerant pipes 20. The fin 25 is joined to two adjacent refrigerant pipes 20 by jointing material having excellent property for heat transfer. Brazing material may be used as the jointing material. The fin 25 has a shape in which a metal plate, such as a thin aluminum, is bent in a wave shape, and has air passageways called as a louver.

The evaporator 6 further has the plurality of cold-storage-medium containers 30. The cold-storage-medium container 30 defines a chamber in which the cold storage medium 50 is accommodated. The cold-storage-medium container 30 accommodates the cold storage media 50, such as paraffin. The cold storage medium 50 is the material which carries out a phase transition between the solid phase and the liquid phase at a temperature between a temperature given at the time of activating the refrigeration cycle 1 and a temperature given at the time of deactivating the refrigeration cycle 1, and can provide cold storage and cold discharge reversibly. The cold storage medium 50 is cooled by a low temperature provided by a refrigerant at the time of activating the refrigeration cycle 1, and is transferred to the solid phase. The cold storage medium 50 is heated by cooling air at the time of deactivating the refrigeration cycle 1, and is transferred to the liquid phase.

The cold-storage-medium containers 30 are made of metal, such as aluminum. The cold-storage-medium container 30 has a configuration near a long and slender and flat rectangular parallelepiped. The cold-storage-medium container 30 has a thickness Ts along the length direction X of the evaporator 6, has a longitudinal direction along the height direction Y of the evaporator 6, and has a short hand direction along the width direction Z of the evaporator 6. The cold-storage-medium container 30 defines the chamber for accommodating the cold storage medium 50 therein. The cold-storage-medium container 30 may be formed by a plate material. The cold-storage-medium container 30 has large principal planes on both sides. Two main walls which provide these two principal planes are arranged in parallel to the refrigerant pipe 20, respectively.

The cold-storage-medium container 30 is disposed between two adjacent refrigerant pipes 20. The cold-storage-medium container 30 is thermally connected with two refrigerant pipes 20 arranged on both sides thereof. The cold-storage-medium container 30 is joined to two adjacent refrigerant pipes 20 by using the jointing material excellent in heat transfer. Brazing material or resin materials, such as an adhesive bond may be used as the jointing material. The cold-storage-medium container 30 is brazed to the refrigerant pipe 20. As a result, good heat conduction is established between the cold-storage-medium container 30 and the refrigerant pipes 20.

The thickness Ts of the cold-storage-medium container 30 is almost equal to the thickness Tf of the air passageway. Therefore, the thickness Ts of the cold-storage-medium container 30 is almost equal to the thickness Tf of the fin 25. The fin 25 and the cold-storage-medium container 30 are replaceable with each other. As a result, it is possible to set an arrangement pattern of the plurality of fins 25 and the plurality of cold-storage-medium containers 30 with high level of freedom. The thickness Ts of the cold-storage-medium container 30 is apparently larger than the thickness Tr of the refrigerant pipe 20. This structure is effective to accommodate a lot of cold storage media 50. The cold-storage-medium container 30 has the almost same length L as the length of the fin 25. As a result, the cold-storage-medium container 30 occupies almost all of the longitudinal direction Y of the accommodation part defined between two adjacent refrigerant pipes 20.

The cold-storage-medium container 30 and two refrigerant pipes 20 located on both sides provide one cold storage unit. A plurality of cold storage units having the same structure are arranged in the evaporator 6. These cold storage units are arranged at equal intervals. The plurality of cold storage units are arranged equally on right and left sides along the length direction X of the evaporator 6. The plurality of cold storage units are arranged symmetrically on right and left sides along the length direction X of the evaporator 6.

A plurality of first cold storage units belonging to the first heat exchange portion 15 and a plurality of second cold storage units belonging to the second heat exchange portion 16 are arranged in a stacked manner with respect to the air flow direction AR. One cold-storage-medium container 30 extends over both the first cold storage unit and the second cold storage unit along with the air flow direction AR. The fin 25 also extends over both the first cold storage unit and the second cold storage unit along with the air flow direction AR.

As shown in FIG. 4, the cold-storage-medium container 30 is formed by plate materials 31, 32, and 33. In the cold-storage-medium container 30, a first side plate portion 31 and a second side plate portion 32 are arranged in parallel each other, and define a chamber for accommodating the cold storage medium 50 therebetween. The first side plate portion 31 and the second side plate portion 32 are provided by a single plate material which continues at a folded portion 33. The side plate portions 31 and 32 defines the chamber which is closed by the folded portion 33 at one side and is also closed by a joined portion 34 at remaining three sides. The joined portion 34 is joined by brazing. The side plate portions 31 and 32 are given depressions and projections shape by press working. Here, a direction towards from inside to outside of the cold-storage-medium container 30 is expressed as a projection. Therefore, a direction from outside to inside is expressed as a depression.

The side plate portions 31 and 32 have a large projection 35 which extends over a large area to define the chamber for accommodating the cold storage medium 50. The projection 35 gives a shape of a shallow dish to the side plate portions 31 and 32. The projection 35 defines the thickness Ts of the cold-storage-medium container 30. The projection 35 is formed to spread at least an area opposite to the refrigerant pipe 20. The projection 35 spreads along with the refrigerant pipe 20. The projection 35 spreads almost over the cold-storage-medium container 30. All sides of the projection 35 are closed by the folded portion 33 or the joined portion 34.

The side plate portions 31 and 32 have a plurality of depressions 36 and 37 on a part to be adjacent to the refrigerant pipe 20. The plurality of depressions 36 and 37 are dented by a depth corresponding to the height of the projection 35 from a top surface of the projection 35. The depression 36 projects toward inside of the cold-storage-medium container 30 from an outside surface of the cold-storage-medium container 30 which faces the refrigerant pipe 20. The depressions 36 and 37 have a configuration which may be called a circular dimple. The depressions 36 and 37 have a configuration corresponding to a truncated cone. The plurality of depressions 36 and 37 are independent each other. The plurality of depressions 36 and 37 are arranged at the area of the projection 35.

The depressions 36 and 37 formed on the side plate portion 31 and the depressions 36 and 37 formed on the side plate portion 32 come in contact with each other at the top portions thereof. One of the top portions and the other one of the top portions are joined by brazing. It is possible to provide the cold-storage-medium container 30 with a high rigidity by joining the depressions 36 and 37 on both surfaces at the top portions. Accordingly, since it is possible to withstand against relatively large internal pressure change, and it is possible to reduce an excessive deformation.

According to this embodiment, it is possible to promote heat conduction to the cold storage medium 50 by the depressions 36 and 37 formed on the side plate portions 31 and 32, without disposing an inner fin within the cold-storage-medium container 30. Accordingly, it is possible to promote heat conduction only by the side plate portions 31 and 32.

Furthermore, the side plate portions 31 and 32 have an engaging projection 38 positioned between the first refrigerant pipe 21 and the second refrigerant pipe 22. The engaging projection 38 may also be called as an engaging portion. The engaging projection 38 is further projected from the projection 35 towards outside of the cold-storage-medium container 30. The engaging projection 38 defines position of the cold-storage-medium container 30 to the refrigerant pipes 20 by fitting and engaging with the refrigerant pipes 20. The engaging projection 38 may be called as a positioning portion or a positioning projection.

The first refrigerant pipe 21 and the second refrigerant pipe 22 are arranged to provide at least two rows along with the air flow direction AR. A gap about the width direction Z is formed between the first refrigerant pipe 21 and the second refrigerant pipe 22. This gap extends along with the height direction Y. The engaging projection 38 is located in the gap between the first refrigerant pipe 21 and the second refrigerant pipe 22. The engaging projection 38 touches both the first refrigerant pipe 21 and the second refrigerant pipe 22. The engaging projection 38 defines position of the cold-storage-medium container 30 to the refrigerant pipes 20 by fitting and engaging in between the refrigerant pipes 21 and 22 which are arranged in two rows. The engaging projection 38 accurately defines position of the cold-storage-medium container 30 to the refrigerant pipe 20 by shallow fitting and engaging with the refrigerant pipes 20. According to this embodiment, the refrigerant pipes 20 and the cold-storage-medium container 30 are fixed to a predetermined relative positional relationship by the engaging projection 38.

Figure 5:
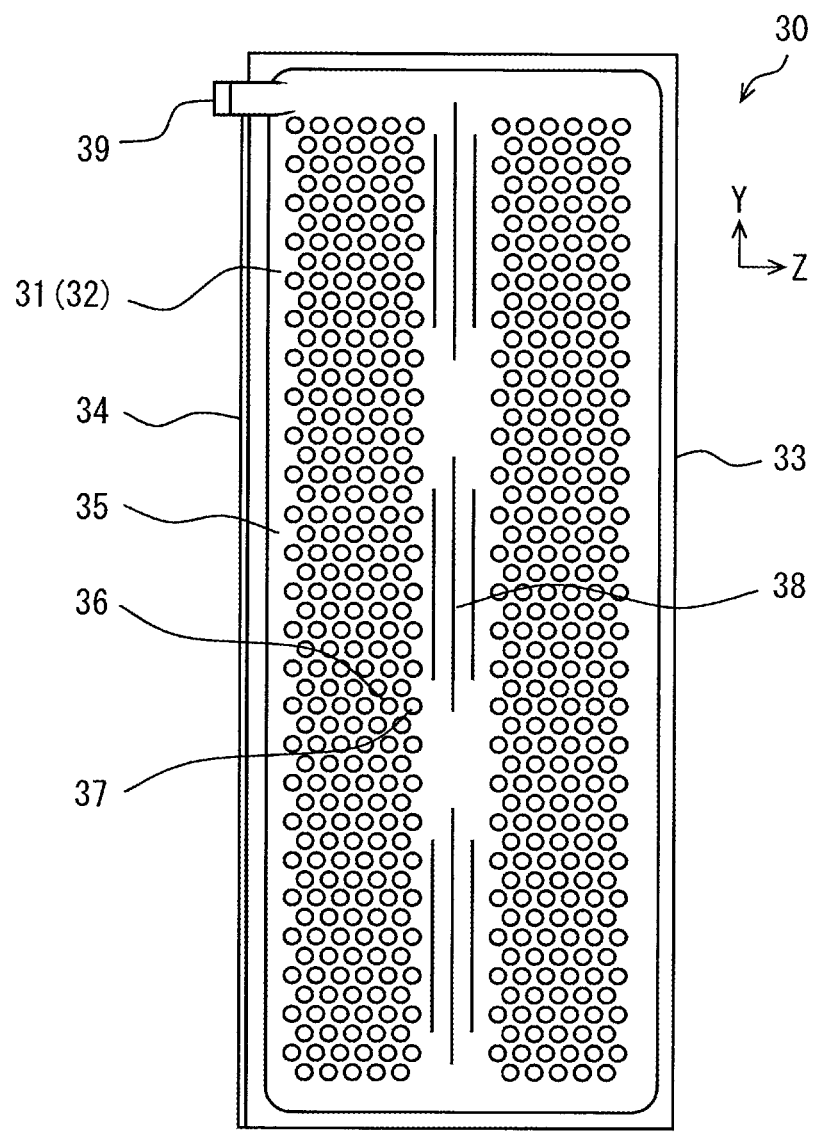
FIG. 5 is a side view of a cold-storage-medium container according to the first embodiment.

As shown in FIG. 5, the plurality of depressions 36 and 37 are arranged on the cold-storage-medium container 30 with a predetermined geometrical regular pattern. The plurality of depressions 36 and 37 are formed with high density. The plurality of depressions 36 and 37 are arranged so that a contact surface area with the cold storage medium 50 is enlarged. The plurality of depressions 36 and 37 are arranged so that thickness of the cold storage medium 50 filled among them may be made small. The plurality of depressions 36 and 37 are arranged so that the heat transfer length only through the cold storage medium 50 may be a predetermined short length equally over an entirety of the cold-storage-medium container 30. In other words, the plurality of depressions 36 and 37 are arranged so that the cold storage medium 50 may equally carry out the phase transition almost simultaneously over an entirety of the cold-storage-medium container 30.

According to this embodiment, major part of the cold storage medium 50 accommodated in the cold-storage-medium container 30 is arranged within a near distance from the side plate portions 31 and 32. When considering the heat conduction from the side plate portions 31 and 32 in the cold storage medium 50, it is desirable that the heat-conduction distance in the cold storage medium 50 from the side plate portions 31 and 32 is short. This heat-conduction distance may also be called phase change distance. In order to solidify the cold storage medium 50, it is necessary to improve heat conduction from the side plate portions 31 and 32. In this embodiment, since a plurality of depressions 36 and 37 are formed in the side plate portions 31 and 32 of the cold-storage-medium container 30, short phase change distance is realized. Heat conduction is promoted by that the above-mentioned phase change distance is short in major part of the cold storage medium 50.

As shown in the drawings, many depressions 36 and 37 are arranged with high consistency corresponding to an adjacent area to the refrigerant pipe 20. As a result, the top surfaces of the projections 35 remaining among the plurality of depressions 36 and 37 become narrow, and serves as a line in a mesh shape. As a result, it is possible to make a brazing surface between the cold-storage-medium container 30 and the refrigerant pipe 20 small, and to reduce voids resulting from brazing spreading over large area.

As shown in the drawings, the engaging projection 38 is a projected line extending along the longitudinal direction Y of the first refrigerant pipe 21 and the second refrigerant pipe 22. The engaging projection 38 may have a plurality of parts spaced apart from each other with respect to the height direction Y.

Figure 6:
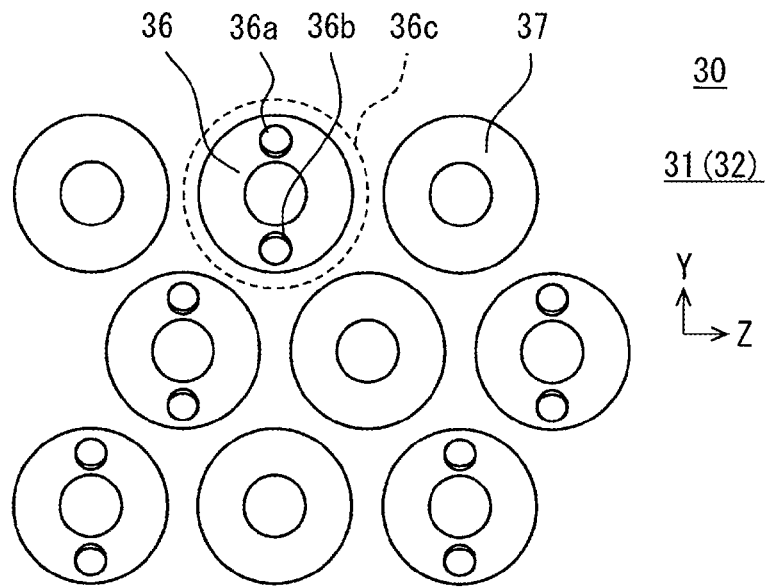
FIG. 6 is a partial cross-sectional view of the cold-storage-medium container according to the first embodiment.

FIG. 6 is an enlarged view showing a group of a part of depressions 36 and 37. As shown in the drawings, the plurality of depressions 36 and 37 contain the depression 36 of an open type which has communicating apertures 36a and 36b which communicate an inside and an outside of the cold-storage-medium container 30. As shown in the drawings, the plurality of depressions 36 and 37 contain the depression 37 of a closed type which does not communicate an inside and an outside of the cold-storage-medium container 30.

A joined portion 36c, which is a loop shape and completely surrounds the depression 36, is formed on a perimeter of the open type depression 36, which is on an inside surface of the cold-storage-medium container 30. The joined portion 36c is provided by the top surface of the projection 35. The cold-storage-medium container 30, i.e., the side plate portions 31 and 32, is brazed with the adjacent refrigerant pipe 20 at this joined portion 36c. The joined portion 36c is formed in a loop shape to surround at least one of the depressions 36, and is joined to the refrigerant pipe 20. In other words, an opening of the depression 36 on an outside surface of the side plate portions 31 and 32 is covered with the refrigerant pipe 20 and brazing material, and is sealed. As a result, a gap defined by the depression 36 between the side plate portions 31 and 32 and the refrigerant pipe 20, i.e., a chamber formed in a truncated cone shape, is communicated with an inside of the cold-storage-medium container 30 via the communicating apertures 36a and 36b, but is not communicated with an outside of the cold-storage-medium container 30. All of the open type depressions 36 are surrounded by the joined portion 36c. As a result, all of the open type depressions 36 are covered with and sealed by the refrigerant pipe 20.

The depression 36 may have one or more communicating apertures 36a and 36b. Number, location, and size of these communicating apertures 36a and 36b are set in order to promote air discharge in a manufacturing process for pouring the cold storage medium 50. In the illustrated example, there is the communicating aperture 36a disposed on an upper side, and the communicating aperture 36b disposed on a lower side when the cold-storage-medium container 30 is arranged in a holing position at the pouring process. Such structure promotes air bubble discharge during the pouring process of the cold storage medium 50.

Returning to FIG. 3, the communicating apertures 36a and 36b are formed on the depression 36 surrounded by the joined portion 36c. The cold storage medium 50 is supplied to the open type depression 36 via the communicating apertures 36a and 36b. Since an open end of the depression 36 is covered by the refrigerant pipe 20, direct contact between the cold storage medium 50 and the refrigerant pipe 20 is provided in the depression 36. The communicating apertures 36a and 36b communicate an inside and an outside of the cold-storage-medium container 30, and allows the cold storage medium 50 to directly contact with the refrigerant pipe 20 by allowing the cold storage medium 50 to pass therethrough to the outside of the depression 36.

According to this structure, a part of the cold storage medium 50 which flowed into the depression 36 performs heat exchange directly with an outside surface of the refrigerant pipe 20, and the remaining part of the cold storage medium 50 performs heat exchange with the side plate portions 31 and 32 which provide the cold-storage-medium container 30. In the depression 36, only a wall member of the refrigerant pipe 20 exists between the refrigerant and the cold storage medium 50. The communicating holes 36a and 36b allow the cold storage medium 50 to pass therethrough to the outside of the depression 36. Direct contact between the cold storage medium 50 and the refrigerant pipe 20 is realized. Accordingly, it is possible to promote heat conduction from the refrigerant pipe 20 to the cold storage medium 50. In addition, the side plate portions 31 and 32 of the cold-storage-medium container 30 which form the depression 36 provide shapes that partially project into inside of the cold-storage-medium container 30. Therefore, heat conduction is promoted. Therefore, heat conduction between the refrigerant and the cold storage medium 50 is improved.

The cold storage medium 50 is not supplied in the closed type depression 37. Therefore, a cavity is formed in the depression 37. The depression 37 provides a cavity which is closed or communicated to the environment.

As shown in FIG. 5, the cold-storage-medium container 30 has a pouring portion 39 for pouring the cold storage medium 50. The pouring portion 39 is provided with a pipe inserted between the side plate portions 31 and 32 and joined. The pouring portion 39 is disposed on an end of the cold-storage-medium container 30. The pouring portion 39 is disposed on an end in the height direction Y of the cold-storage-medium container 30, and on a corner portion of the cold-storage-medium container 30. Thereby, the pouring portion 39 can be positioned in the topmost part by adjusting arrangement of the cold-storage-medium container 30.

In this embodiment, the cold-storage-medium container 30 is brazed in a furnace with other components, such as the refrigerant pipe 20 and the fin 25. The cold storage medium 50 is poured in from the pouring portion 39 after a brazing process. In this pouring impregnation process, an evaporator 6 is arranged so that a poring portion 39 may be positioned in the topmost part of the cold-storage-medium container 30. The cold storage medium 50 is poured into an inside of the cold-storage-medium container 30 from the pouring portion 39. The cold storage medium 50 is poured up to a predetermined height, while discharging air in the cold-storage-medium container 30. The pouring portion 39 is sealed after the cold storage medium 50 is poured in.

Figure 7:
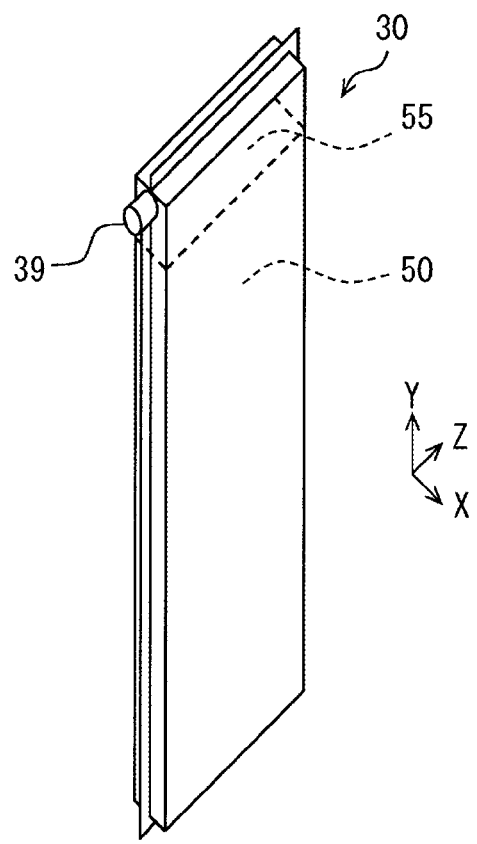
FIG. 7 is a perspective view of the cold-storage-medium container according to the first embodiment.

FIG. 7 schematically shows the cold storage medium 50 in the cold-storage-medium container 30. The cold storage medium 50 is poured and accommodated to leave an air cell 55 in the cold-storage-medium container 30. The cold storage medium 50 provides less than 90% in an occupying ratio of the cold storage medium 50 in an internal volume of the cold-storage-medium container 30, i.e., in a filling ratio within the cold-storage-medium container 30. In this embodiment, the cold storage medium 50 is poured so that the filling ratio is 85%.

Figure 8:
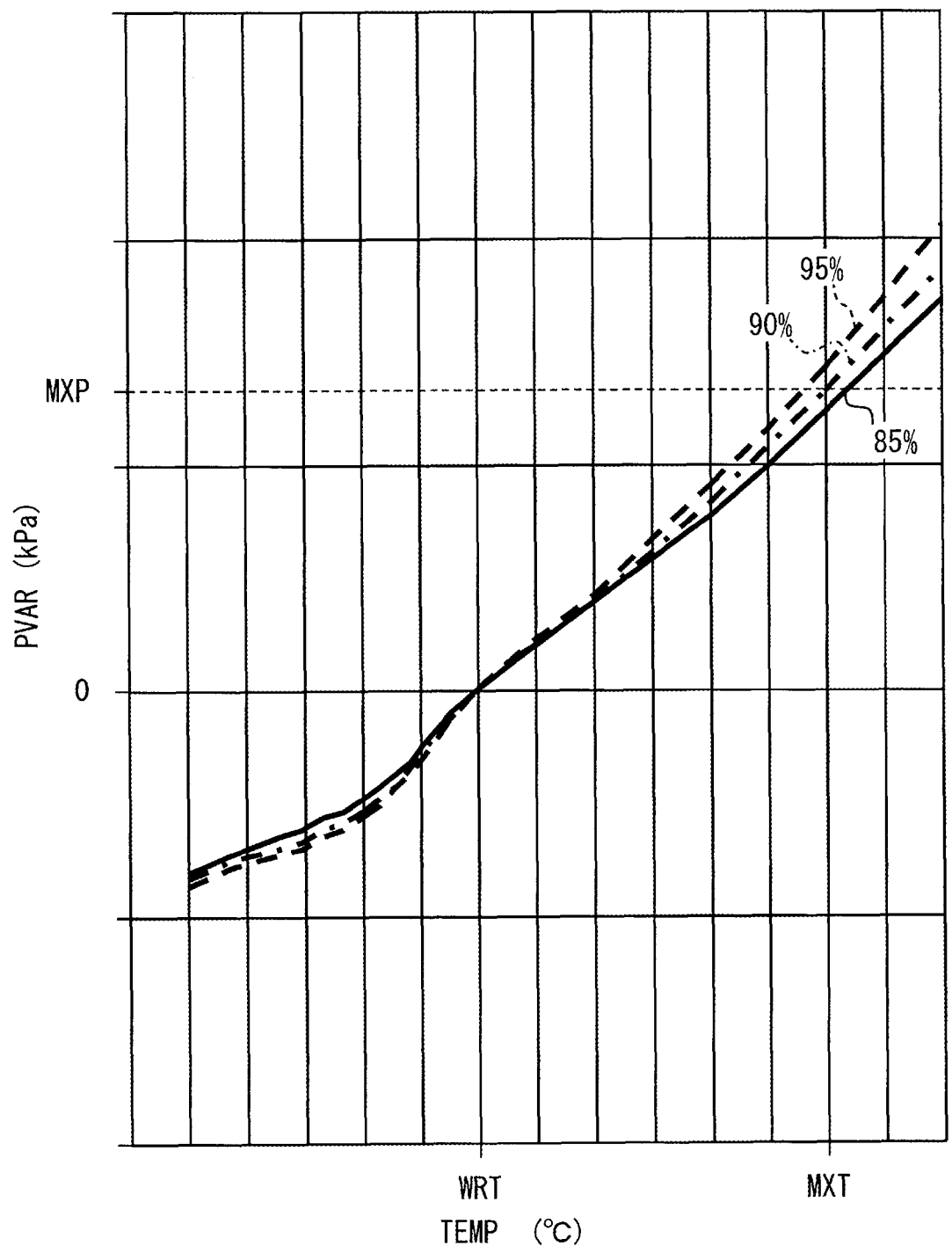
FIG. 8 is a graph showing relationship between an internal pressure in the cold-storage-medium container and temperature.

FIG. 8 shows a relationship between a temperature TEMP and a pressure change PVAR in the cold-storage-medium container 30 after pouring the cold storage medium 50 in the cold-storage-medium container 30 in the environment of the working temperature WRT, and sealed. In the drawing, a solid line shows an example of 85% of the filling ratio. A dash line shows a case of 90% of the filling ratio. A broken line shows a case of 95% of the filling ratio.

The evaporator 6 containing the cold storage medium is designed in order to not lose a function even after if it is exposed to the highest temperature MXT set according to the application. For example, it is required to keep an initial shape without damages on the cold-storage-medium container 30, even if the temperature of the evaporator 6 reaches the highest temperature MXT. Specifically, in order to reduce excessive deformation of the cold-storage-medium container 30, the upper limit MXP of the internal pressure change PVAR after seal may be set.

In a vehicle application, the highest temperature MXT may be set at 80 degrees Celsius. It is because vehicular components may be heated up to about 80 degrees Celsius by the remaining heat of the power source after operating vehicles, or by sun light radiation in the summer, etc. In a case of assuming an application for a vehicle air-conditioner, there may be a possibility that the temperature of the evaporator 6 may reach close to the highest temperature MXT. Expansion of the cold storage medium 50 by increase of temperature brings increase of the internal pressure.

Therefore, in a vehicle application, it is desirable that the internal pressure change is less than the upper limit MXP in a range below the highest temperature MXT.

In the illustrated example, it is possible to keep an internal pressure change lower than an upper limit MXP by setting the filling ratio less than 90%. Furthermore, in this embodiment, the filling ratio is set at 85% in order to prevent deformation of the cold-storage-medium container 30 more certainly.

The paraffin providing the cold storage medium 50 produces about 7% of volume change by a temperature difference between a working temperature WRT at the time of pouring work, e.g., 20 degrees Celsius, and the highest temperature MXT, e.g., 80 degrees Celsius. There are unavoidable errors, such as an error of a poured amount of the cold storage medium 50 and an error of a shape of the cold-storage-medium container 30. Accordingly, in order to suppress deformation of the cold-storage-medium container 30 caused by internal pressure change by absorbing volume change of the cold storage medium 50 by the air cell 55, it is desirable to set the filling ratio less than 90%. According to this embodiment, the filling ratio of the cold storage medium 50 is set less than 90%. Therefore, it is possible to reduce deformation of the cold-storage-medium container 30.

Next, operation of this embodiment is explained. If there is an air conditioning request from a passenger, for example, a cooling request, the compressor 3 is driven by the power source 2. The compressor 3 sucks and compresses a refrigerant from the evaporator 6, and discharges it. The refrigerant discharged from the compressor 3 radiates heat in the radiator 4. The refrigerant flowing out from the radiator 4 is decompressed at the reducer 5 and supplied to the evaporator 6. The refrigerant evaporates in the evaporator 6 and cools the cold-storage-medium container 30 and cools air through the fin 25. If a vehicle stops temporarily, the power source 2 also stops working to reduce energy consumption, and the compressor 3 is also stopped. Then, the refrigerant in the evaporator 6 loses cooling capability gradually. In this process, the cold storage medium 50 discharges cool to cool air. At this time, the thermal energy of air is conducted to the cold storage medium 50 through the fin 25, the refrigerant pipe 20, and the cold-storage-medium container 30. As a result, even if the refrigeration cycle 1 stops temporarily, air can be cooled by the cold storage medium 50. If the vehicle begins to move again, the power source 2 drives the compressor 3 again. Accordingly, the refrigeration cycle 1 cools and the cold storage medium 50 again and storages cool.

As explained above, according to this embodiment, since heat conduction between the refrigerant and the cold storage medium is improved, it is possible to provide a cold storage heat exchanger with a quick cold storage speed.

Second Embodiment

Figure 9:
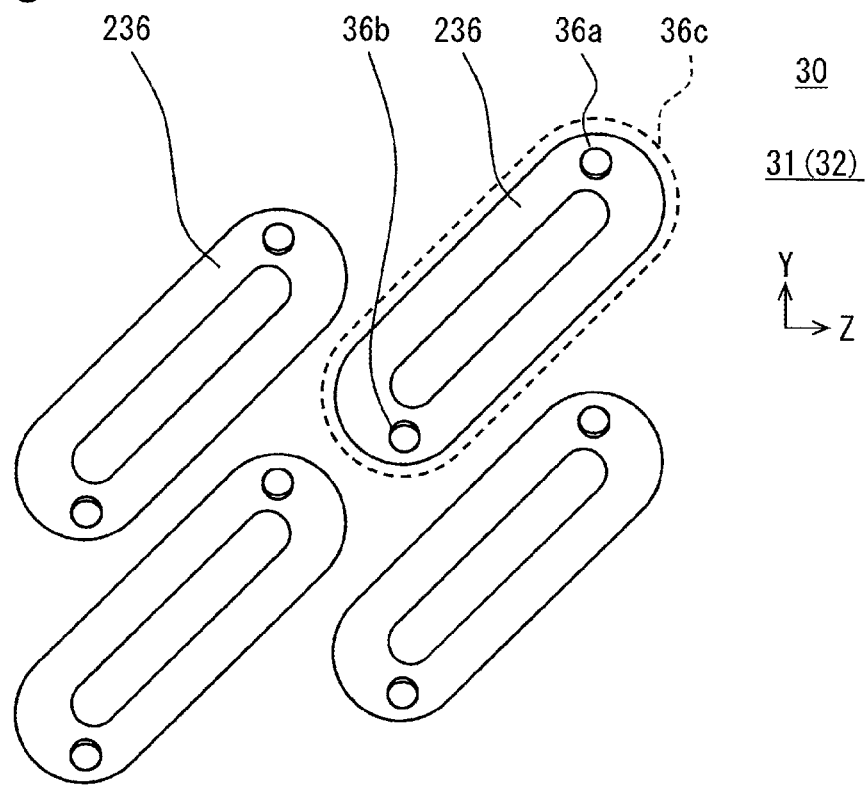
FIG. 9 is a partial cross-sectional view of a cold-storage-medium container according to a second embodiment.

FIG. 9 shows a second embodiment which uses the above-mentioned embodiments as base structure. In the preceding embodiments, the projections 36 and 37 in truncated cone shapes are used. Alternatively, depressions with various shapes may be used. The cold-storage-medium container 30 of this embodiment has a depression 236 in a long and slender ellipse shape. The depression 236 is an ellipse shape extending in an inclined manner with respect to both the height direction Y and the width direction Z of the evaporator 6. In the preceding embodiment, the closed type depression 37 is used together. Alternatively, the cold-storage-medium container 30 of this embodiment has only the open type depression 236. It is possible to provide a cold storage heat exchanger with a quick cold storage speed.

Third Embodiment

Figure 10:
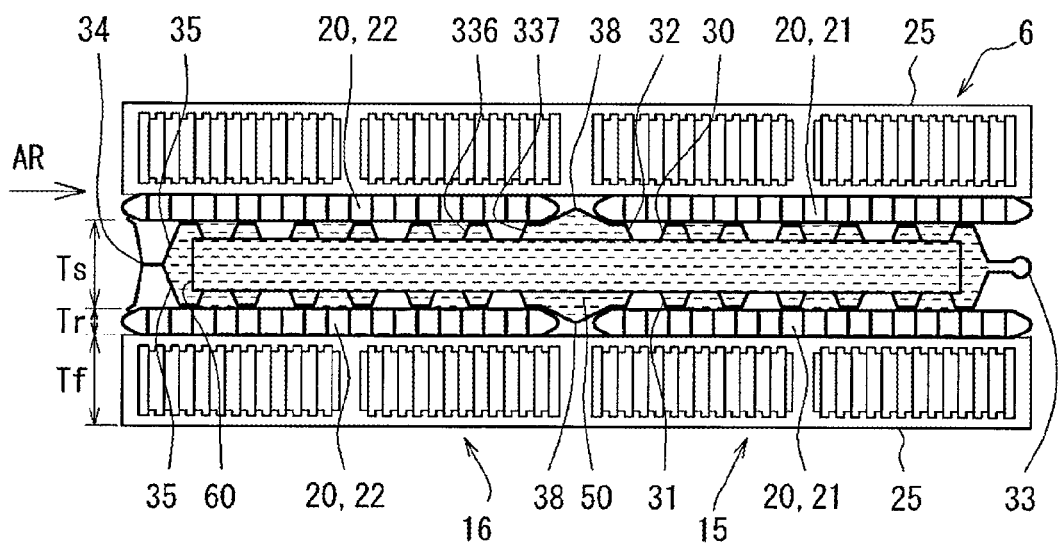
FIG. 10 is a partial cross-sectional view of a cold storage heat exchanger according to a third embodiment.

FIG. 10 shows a third embodiment which uses the above-mentioned embodiments as base structure. In the preceding embodiments, only the side plate portions 31 and 32 provide the cold-storage-medium container 30. Alternatively, in this embodiment, the inner fin 60 is used additionally. The inner fin 60 is arranged inside the cold-storage-medium container 30. The inner fin 60 promotes heat conduction to the cold storage medium 50. The inner fin 60 is being pinched between the side plate portions 31 and 32 and fixed. The inner fin 60 is brazed on the side plate portions 31 and 32.

The side plate portions 31 and 32 have an open type depression 336 and a closed type depression 337. Top portion of these depressions 336 and 337 are joined to the inner fin 60 without being joined each other. This embodiment may also use only the open type depression 336. It is possible to provide a cold storage heat exchanger with a quick cold storage speed.

Fourth Embodiment

Figure 11:
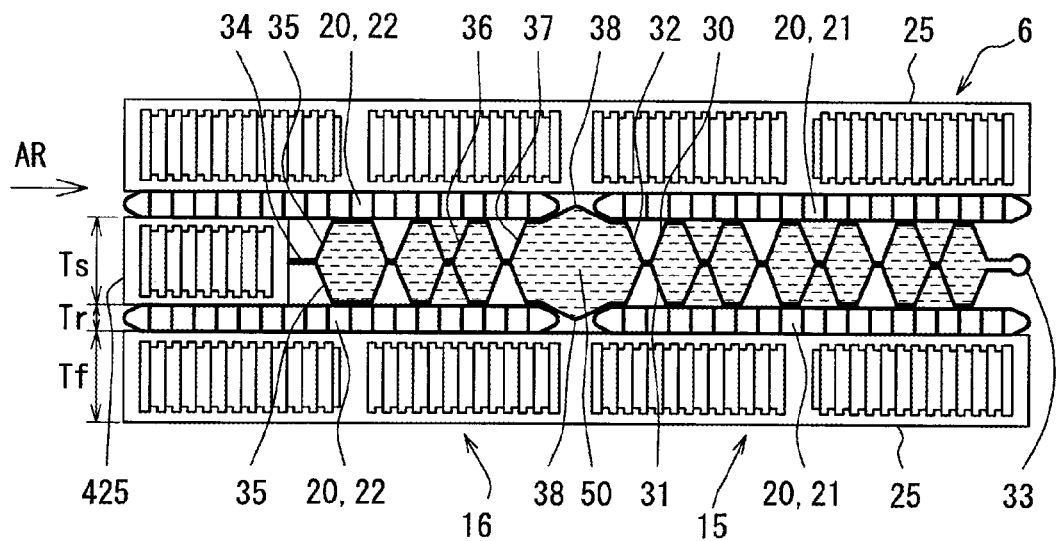
FIG. 11 is a partial cross-sectional view of a cold storage heat exchanger according to a fourth embodiment.

FIG. 11 shows a fourth embodiment which uses the above-mentioned embodiments as base structure. In the above-mentioned embodiments, only the cold-storage-medium container 30 is arranged in the accommodation part. Alternatively, in this embodiment, both an outer fin 425 and the cold-storage-medium container 30 are arranged in the accommodation part. The outer fin 425 is arranged on an upstream side than the cold-storage-medium container 30 with respect to the air flow direction AR. The outer fin 425 is joined to the refrigerant pipe 20. The outer fin 425 cools air which contacts the cold-storage-medium container 30. The cold-storage-medium container 30 has a size corresponding to an entirety of the refrigerant pipe 21 and a downstream portion of the refrigerant pipe 22.

When the refrigeration cycle 1 is activated and the refrigerant is supplied to the evaporator 6, the outer fin 425 is cooled with the refrigerant. A part of air for air conditioning contacts with the cold-storage-medium container 30 after being cooled with the outer fin 425. Direct contact between not yet cooled hot air for air conditioning and the cold-storage-medium container 30 is suppressed. As a result, it is possible to promote cold storage in the cold-storage-medium container 30.

Fifth Embodiment

Figure 12:
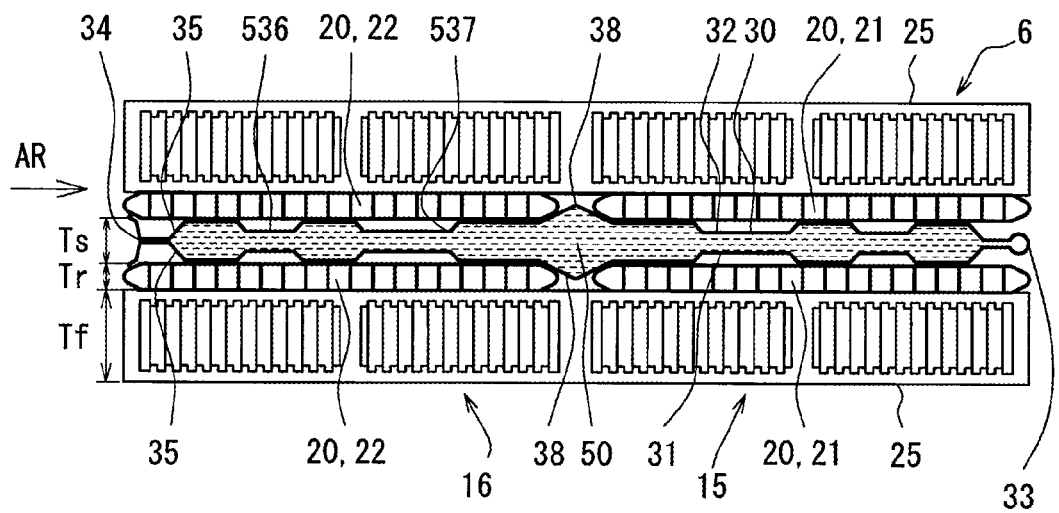
FIG. 12 is a partial cross-sectional view of a cold storage heat exchanger according to a fifth embodiment.

FIG. 12 shows a fifth embodiment which uses the above-mentioned embodiments as base structure. The top portions of the depressions 36 and 37 are joined in the preceding embodiments. Alternatively, in this embodiment, the cold-storage-medium container 30 has depressions 536 and 537 of which top portions are not joined each other. In the preceding embodiments, the thickness Ts of the cold-storage-medium container 30 is almost equal to the thickness Tf of the fin 25. Alternatively, in this embodiment, the thickness Ts of the cold-storage-medium container 30 is smaller than the thickness Tf of the fin 25. This thinner cold-storage-medium container 30 allows heat-conduction distance in the cold storage medium 50 from the side plate portions 31 and 32 to be small. The thickness Ts and Tf is a size about the length direction X of the evaporator 6.

By this structure, the heat-conduction distance passing through the inside of the cold storage medium 50 becomes short, and a cold storage speed is improved. Furthermore, in this embodiment, the heat conduction in the cold storage medium 50 can be promoted by setting Ts<Tf without using an inner fin. Moreover, in this embodiment, it is possible to provide a cold storage heat exchanger with a quick cold storage speed by using a small number of depressions 536 and 537.

Sixth Embodiment

Figure 13:
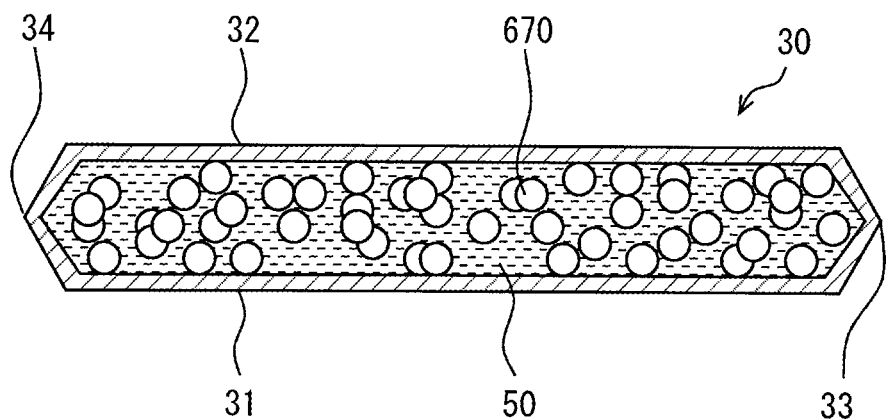
FIG. 13 is a cross-sectional view of a cold-storage-medium container according to a sixth embodiment.

FIG. 13 shows a sixth embodiment which uses the above-mentioned embodiments as base structure. In the above-mentioned embodiments, only the cold storage medium 50 is poured in the cold-storage-medium container 30. Alternatively, in this embodiment, the cold-storage-medium container 30 accommodates therein the cold storage medium 50 and a plurality of heat-conduction promoting member 670 which has thermal conductivity higher than the cold storage medium 50. The heat-conduction promoting member 670 is not fixedly joined to the side plate portions 31 and 32 which provide an outer shell of the cold-storage-medium container 30. The heat-conduction promoting member 670 is a particle member which can flow with the cold storage medium 50. The heat-conduction promoting member 670 can be provided with metal with thermal conductivity higher than the cold storage medium 50. The heat-conduction promoting member 670 can have a very small ball-shaped form. The heat-conduction promoting member 670 is applicable to other preceding embodiments.

According to this embodiment, the thermal conductivity of the cold storage medium 50 in the cold-storage-medium container 30 is improved. Since the heat-conduction promoting member 670 can flow with the cold storage medium 50, it is easy to handle it. Moreover, the heat-conduction promoting member 670 can be poured in the cold-storage-medium container 30 with the cold storage medium 50.

Seventh Embodiment

Figure 14:
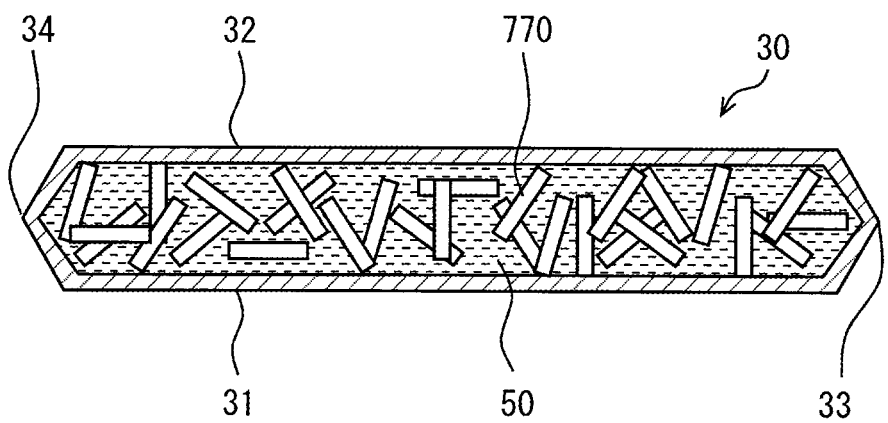
FIG. 14 is a cross-sectional view of a cold-storage-medium container according to a seventh embodiment.

FIG. 14 shows a seventh embodiment which uses the above-mentioned embodiments as base structure. In the preceding embodiments, the ball-shaped heat-conduction promoting member 670 is mixed in the cold storage medium 50. Alternatively, in this embodiment, a columnar-shaped heat-conduction promoting member 770 is mixed in the cold storage medium 50. The heat-conduction promoting member 770 is not fixedly joined to the side plate portions 31 and 32 which provide an outer shell of the cold-storage-medium container 30. The heat-conduction promoting member 770 is a very small columnar member which can flow with the cold storage medium 50. The heat-conduction promoting member 770 can be provided by metal or a carbon nanotube having thermal conductivity higher than the cold storage medium 50. The heat-conduction promoting member 770 is applicable to other preceding embodiments. In this embodiment, the thermal conductivity of the cold storage medium 50 in the cold-storage-medium container 30 is improved.

Eighth Embodiment

Figure 15:
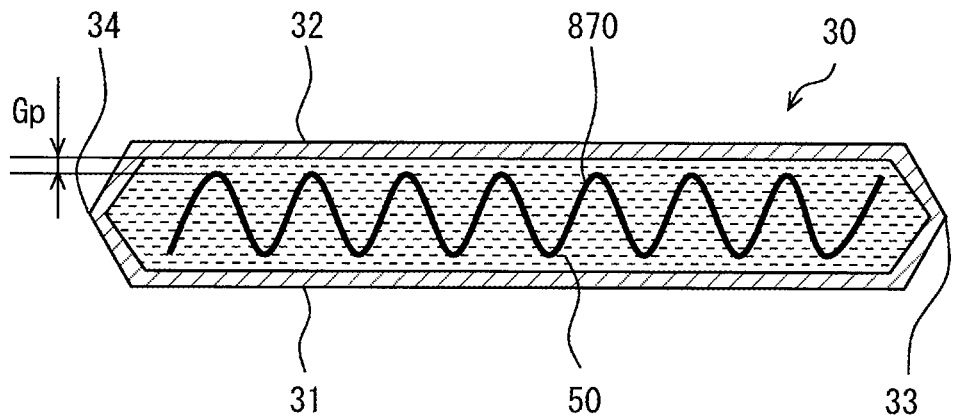
FIG. 15 is a partial cross-sectional view of a cold-storage-medium container according to an eighth embodiment.

FIG. 15 shows an eighth embodiment which uses the above-mentioned embodiments as base structure. In the above-mentioned embodiments, very small heat-conduction promoting members 670 and 770 are mixed in the cold storage medium 50. Alternatively, in this embodiment, the cold-storage-medium container 30 has an inner fin 870 which is not fixedly joined to the side plate portions 31 and 32. The inner fin 870 is made of metal, such as aluminum. The inner fin 870 is not brazed on the side plate portions 31 and 32. The inner fin 870 can move in the cold storage medium 50. A gap Gp which is big enough to allow movement is formed between the inner fin 870 and the side plate portions 31 and 32. The inner fin 870 is applicable to other preceding embodiments. In this embodiment, the thermal conductivity of the cold storage medium 50 in the cold-storage-medium container 30 is improved.

Other Embodiments

The preferred embodiments of the present disclosure have been described. However, the present disclosure is not limited to the above embodiments, and the above embodiments may be modified in various ways without departing from the spirit and scope of the invention. The configuration of the above described embodiments is just examples. The invention in its broader terms is therefore not limited to the specific details, representative apparatus, and illustrative examples shown and described. The present disclosure is not limited to the above combination, and disclosed technical means can be practiced independently or in various combinations. Some extent of the disclosure may be shown by the scope of claim, and also includes the changes, which is equal to and within the same range of the scope of claim.

For example, in the preceding embodiments, the perimeter of one of the open type depressions 36 is completely surrounded by one joined portion 36c. Alternatively, an area containing a plurality of open type depressions 36 may be completely surrounded by one loop shaped joined portion 36c.

In the preceding embodiments, the side plate portions 31 and 32 are provided by bending a single plate material at the folded portion 33. Alternatively, the cold-storage-medium container 30 may be formed by using a single plate material providing the side plate portion 31 and a single plate material providing the side plate portion 32.

In the preceding embodiments, the projections 35 are formed on both sides of the cold-storage-medium container 30, and the depressions 36 and 37 are also formed on both sides. Alternatively, projections 35 may be formed only on one side of the cold-storage-medium container 30 and the depressions 36 and 37 may also be formed only on the one side. Remaining side may be provides as a flat shaped side plate portion.

In the preceding embodiments, the refrigerant pipes 20 are arranged on both sides of one cold-storage-medium container 30, and both of the refrigerant pipes 20 are joined to the cold-storage-medium container 30. Alternatively, the refrigerant pipe 20 may be arranged on and joined only one side of one cold-storage-medium container 30. A fin 25 may be arranged on the other side. That is, the cold-storage-medium container 30 may be arranged next to at least one of the refrigerant pipe 20, and may be joined to the refrigerant pipe concerned.

In the preceding embodiments, the fin 25 is arranged in the air passageway formed between the refrigerant pipe 20 and the refrigerant pipe 20. Alternatively, the fin 25 may be arranged in an air passageway formed between the refrigerant pipe 20 and the cold-storage-medium container 30 or between the cold-storage-medium container 30 and the cold-storage-medium container 30.

In the preceding embodiments, the fin 25 is arranged in the air passageway. Alternatively, a fin-less configuration, which forms the air passageway, but has no fin 25, may be used.

What is claimed is:

1. A cold storage heat exchanger, comprising:
a plurality of refrigerant pipes, each having a refrigerant passage; and
a cold-storage-medium container which defines a chamber in which a cold storage medium is accommodated, the cold-storage-medium container being disposed next to at least one of the plurality of refrigerant pipes and being joined to at least one of the plurality of refrigerant pipes, wherein
the plurality of refrigerant pipes and/or the cold-storage-medium container define an air passageway for carrying out heat exchange with air, and wherein
the cold-storage-medium container includes:
a plurality of independent partial depressions which project inward from an outside surface facing the plurality of refrigerant pipes;
a joined portion which is formed to surround at least one of the plurality of depressions, and is joined to the plurality of refrigerant pipes; and
a communicating aperture which is formed on the plurality of depressions surrounded by the joined portion, and communicates with an inside and an outside of the cold-storage-medium container, and allows the cold storage medium to directly contact with the plurality of refrigerant pipes by allowing the cold storage medium to pass therethrough to the outside of the plurality of depressions.

2. The cold storage heat exchanger in claim 1, wherein the joined portion is formed in a loop shape.

3. The cold storage heat exchanger in claim 1, wherein the cold storage medium is accommodated to leave an air cell within the cold-storage-medium container, and provides less than 90% in a filling ratio within the cold-storage-medium container.

4. The cold storage heat exchanger in claim 1, wherein the cold-storage-medium container has an engaging portion which defines a position of the cold-storage-medium container with respect to the plurality of refrigerant pipes by engaging with the plurality of refrigerant pipes.

5. The cold storage heat exchanger in claim 1, further comprising
an outer fin which is arranged on an upstream side of the cold-storage-medium container with respect to the air flow direction, and is joined to the plurality of refrigerant pipes, and cools the air which contacts the cold-storage-medium container.

6. The cold storage heat exchanger in claim 1, wherein a thickness of the cold-storage-medium container is smaller than a thickness of the air passageway.

7. The cold storage heat exchanger in claim 1, wherein the cold-storage-medium container has therein a heat-conduction promoting member which has thermal conductivity higher than the cold storage medium and is not fixedly joined to the cold-storage-medium container.

8. The cold storage heat exchanger in claim 1, wherein the plurality of refrigerant pipes are arranged in at least two rows on both an upper side and a lower side of the cold-storage-medium container along an air flow direction, and are mirrored on either side of the cold-storage-medium container, and wherein the cold-storage-medium container includes:
a projection which spreads along with the plurality of refrigerant pipes; and
an engaging projection which projects further from the projection towards the outside surface of the cold-storage-medium container, and is a projected line extending along the plurality of refrigerant pipes, and defines a position of the cold-storage-medium container with respect to the plurality of refrigerant pipes by engaging with the plurality of refrigerant pipes arranged in two rows, wherein
the plurality of depressions are arranged on an area of the projection.

9. A cold storage heat exchanger, comprising:
a plurality of refrigerant pipes, each having a refrigerant passage; and
a cold-storage-medium container which defines a chamber in which a cold storage medium is accommodated, the cold-storage-medium container being disposed next to at least one of the plurality of refrigerant pipes and being joined to at least one of the plurality of refrigerant pipes, wherein
the plurality of refrigerant pipes and/or the cold-storage-medium container define an air passageway for carrying out heat exchange with air, and wherein the cold storage heat exchanger, further comprises:
an outer fin which is arranged on an upstream side of the cold-storage-medium container with respect to the air flow direction, and is joined to the plurality of refrigerant pipes, and cools the air which contacts the cold-storage-medium container, wherein
the plurality of refrigerant pipes are arranged in at least two rows on both an upper side and a lower side of the cold-storage-medium container along an air flow direction, and are mirrored on either side of the cold-storage-medium container, and wherein
the cold-storage-medium container includes:
a projection which spreads along with the plurality of refrigerant pipes; and
an engaging projection which projects further from the projection towards an outside of the cold-storage-medium container, and is a projected line extending along the plurality of refrigerant pipes, and defines a position of the cold-storage-medium container with respect to the plurality of refrigerant pipes by engaging with the plurality of refrigerant pipes arranged in two rows, and
a plurality of independent depressions arranged on an area of the projection.

10. A cold storage heat exchanger, comprising:
a plurality of refrigerant pipes, each having a refrigerant passage; and
a cold-storage-medium container which defines a chamber in which a cold storage medium is accommodated, the cold-storage-medium container being disposed next to at least one of the plurality of refrigerant pipes and being joined to at least one of the plurality of refrigerant pipes, wherein
the plurality of refrigerant pipes and/or the cold-storage-medium container define an air passageway for carrying out heat exchange with air, and wherein a thickness of the cold-storage-medium container is smaller than a thickness of the air passageway, wherein
the plurality of refrigerant pipes are arranged in at least two rows on both an upper side and a lower side of the cold-storage-medium container along an air flow direction, and are mirrored on either side of the cold-storage-medium container, and wherein the cold-storage-medium container includes:
a projection which spreads along with the plurality of refrigerant pipes; and
an engaging projection which projects further from the projection towards an outside of the cold-storage-medium container, and is a projected line extending along the plurality of refrigerant pipes, and defines a position of the cold-storage-medium container with respect to the plurality of refrigerant pipes by engaging with the refrigerant pipes arranged in two rows, and
a plurality of independent depressions arranged on an area of the projection.

11. The cold storage heat exchanger in claim 10, wherein the thickness of the cold-storage-medium container is defined by portions joined to the plurality of refrigerant pipes.

12. A cold storage heat exchanger, comprising:
a plurality of refrigerant pipes, each having a refrigerant passage; and
a cold-storage-medium container which defines a chamber in which a cold storage medium is accommodated, the cold-storage-medium container being disposed next to at least one of the plurality of refrigerant pipes and being joined to at least one of the plurality of refrigerant pipes, wherein
the plurality of refrigerant pipes and/or the cold-storage-medium container define an air passageway for carrying out heat exchange with air, and wherein the cold-storage-medium container has therein a heat-conduction promoting member which has thermal conductivity higher than the cold storage medium and is not fixedly joined to the cold-storage-medium container, wherein
the plurality of refrigerant pipes are arranged in at least two rows on both an upper side and a lower side of the cold-storage-medium container along an air flow direction, and are mirrored on either side of the cold-storage-medium container, and wherein
the cold-storage-medium container includes:
a projection which spreads along with the plurality of refrigerant pipes; and
an engaging projection which projects further from the projection towards an outside of the cold-storage-medium container, and is a projected line extending along the plurality of refrigerant pipes, and defines a position of the cold-storage-medium container with respect to the plurality of refrigerant pipes by engaging with the plurality of refrigerant pipes arranged in two rows, and
a plurality of independent depressions arranged on an area of the projection.

* * * * *